Oct. 16, 1951  J. A. STEVENS  2,571,496
MULCH HANDLING DEVICE FOR USE WITH AGRICULTURAL
IMPLEMENTS HAVING EARTH-WORKING ELEMENTS
Filed May 2, 1946  3 Sheets-Sheet 1
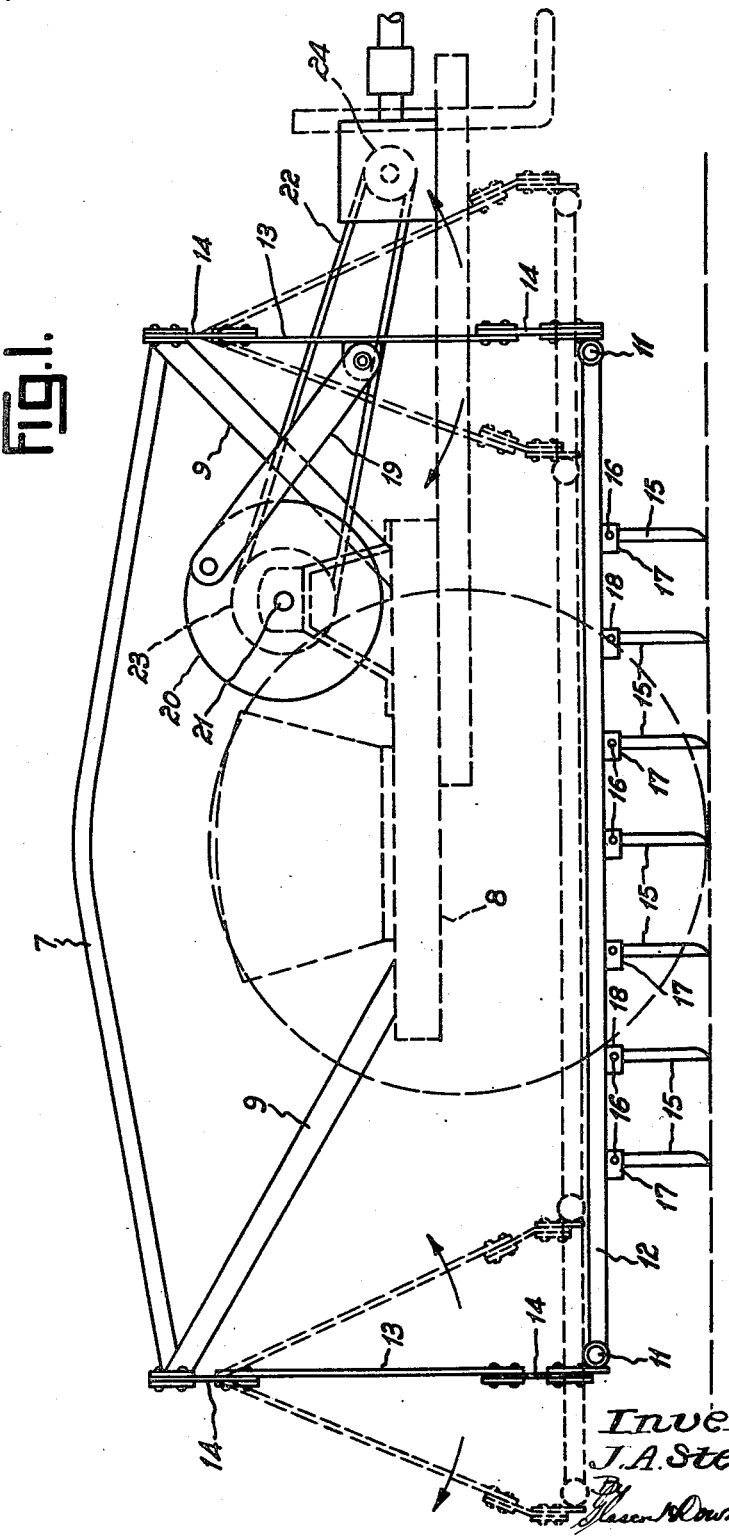
Inventor
J. A. Stevens

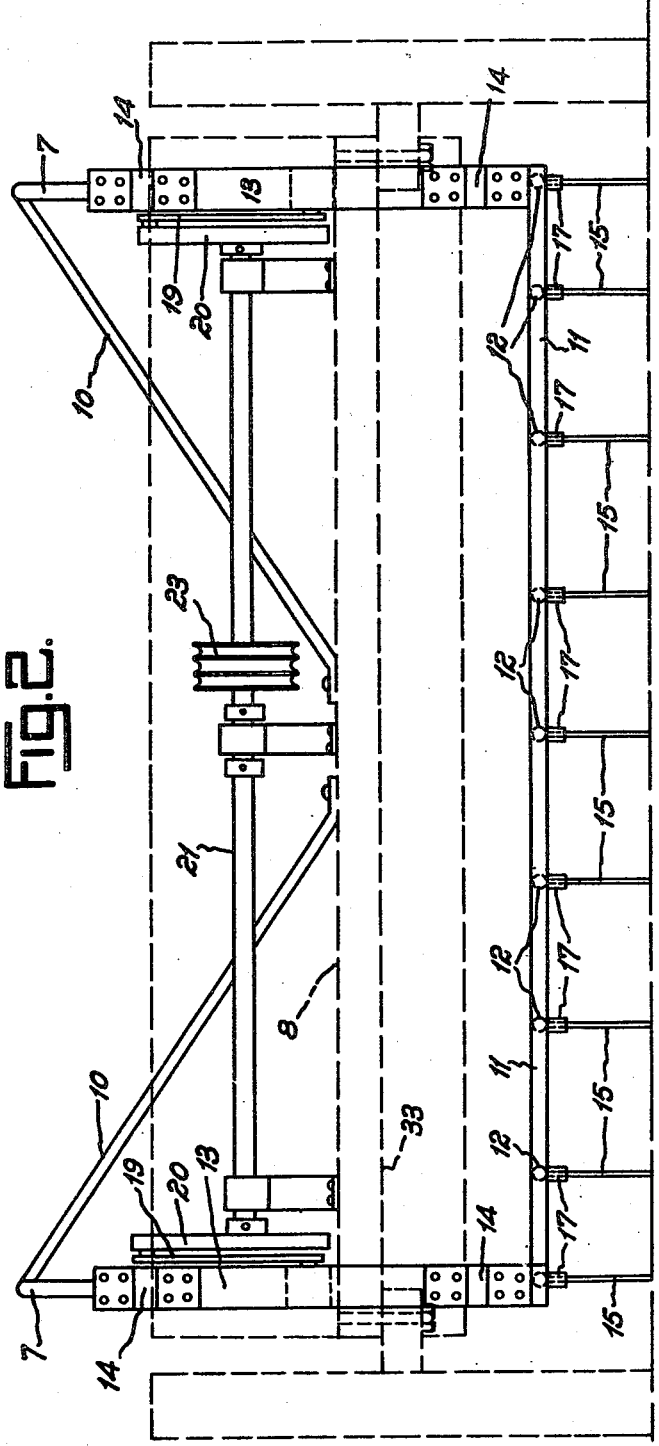

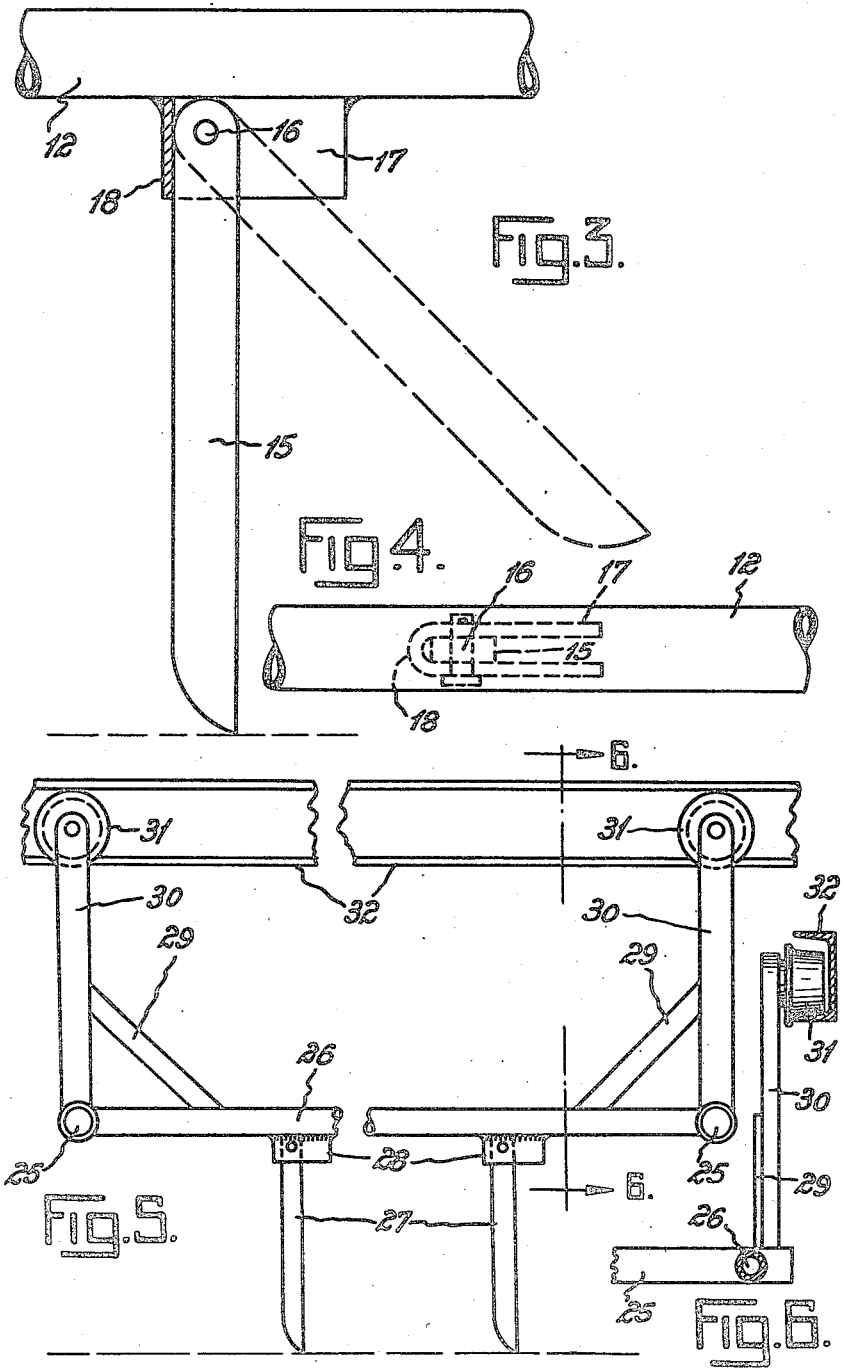

Patented Oct. 16, 1951

2,571,496

UNITED STATES PATENT OFFICE 2,571,496

MULCH HANDLING DEVICE FOR USE WITH AGRICULTURAL IMPLEMENTS HAVING EARTH-WORKING ELEMENTS

John Aloysius Stevens, Tamworth, New South Wales, Australia

Application May 2, 1946, Serial No. 666,720
In Australia May 18, 1945

3 Claims. (Cl. 97—194)

In order to combat soil erosion, a practice which has increasingly come into favour, particularly in wheat farming areas, is to leave the grain-stripped straw on the surface of the soil as a mulch. It has been found that the greatest benefits are derivable from this so-called stubble mulching if the straw is not extensively mixed with the soil but, as far as possible, is left simply laying or standing on the soil surface.

While stubble mulching, as referred to above, is a very effective method of combating soil erosion, it has the disadvantage of interfering with efficient cultivation, ploughing or other earth-working operations, such as the use of seed drills or other elements which are required to work (that is, penetrate) the soil, and/or deposit seeds below the earth's surface.

The object of this invention is the provision of simple means whereby cultivation, seed drilling, ploughing, or other operation involving penetration of the earth's surface with tines, drills, plough shares, discs, or other "earth-working" elements, may be effected without causing the straw mulch to become substantially admixed with the soil, without impairing effective soil coverage due to the mulch, and without serious impediment to forward motion of the earth-working elements by straw accumulations thereon.

Accordingly, the present invention may be shortly summarised as consisting in mulch handling devices for use with an agricultural implement of the kind having earth-working elements thereon, said devices comprising a plurality of straw-walker fingers or prongs which are mounted and adapted for reciprocatory motion whereby a mulch is restrained or held, or largely restrained or held against being moved forwardly with or by the earth-working elements of the machine. The prongs operate to transfer the straw mulch rearwardly (relative to the implement or its direction of travel) or clear of said earth-working elements so that said elements may operate in the soil freely or at least without excessive hindrance due to the mulch, and without build-up of mulch accumulations on the earth-working elements, which, if not prevented, would rapidly halt progress of the implement. The prongs also operate in such manner as to avoid substantial burying of mulch or interruption of mulch coverage continuity.

Preferred examples of the invention are illustrated by the accompanying drawings which are more or less schematic.

Figure 1 is a side elevation of a prong array as applied to a common seeder (shown incompletely by dotted lines).

Figure 2 is an end elevation projected from Figure 1.

Figure 3 is a side elevation (partly sectioned and on an enlarged scale) of a prong mounting.

Figure 4 is a plan corresponding to Figure 3.

Figure 5 is an incomplete side elevation illustrating a modification.

Figure 6 is a sectional end elevation taken on line 6—6 in Figure 5.

Referring to Figures 1 to 4, a pair of support bars 7 are mounted on the chassis 8 of the seeder (or other implement to which the invention is to be applied) in any convenient and structurally rigid manner. For example, by way of struts 9, braces, or stays 10 or the like. A prong frame consisting of lateral members 11 and longitudinal members 12 is suspended from the support bars 7 by hangers which enable longitudinal oscillatory movement of the frame. These hangers may be rigid links pivotally connected by their ends to the bars 7 and the frame 11—12 respectively. The hangers may be spring steel leaves, strips or ribbons with their ends anchored respectively to bars 7 and frame 11—12. In the illustrated arrangement, the hangers each consist of a strip or lath 13 secured to a bar 7 and the frame 11—12 by couplings 14 of rubber, leather or other flexible material.

The mulch engaging prongs 15 are each pivoted (at 16) within a U-shaped bracket 17 welded or otherwise fixed on the longitudinal members 12. The position of each pivot point 16 in relation to the end web 18 of its bracket 17 is such that the prong may hinge freely in one direction, as shown by dotted lines in Figure 3, but in the reverse direction is unable to swing past the substantially vertical disposition, shown by full lines in Figure 3, by reason of said end web constituting a stop.

Oscillatory motion of the prong array may be provided for in several different ways. For example, the frame may be oscillated by hand, or a portion of it may be fashioned as a follower for a cam mounted on one of the axles of the implement. In the illustrated arrangement two of the hanger strips 13 are linked, by connecting rods 19, to crank discs 20 on a shaft 21. The shaft 21 receives drive in conventional manner; for example, by belts 22 or pulleys 23 and 24. Pulley 24 may be driven by way of a power take-off from the engine of the implement (if it be automotive or power operated) or the engine of a tractor for hauling the implement, or by gear sprocket or like transmission from a land wheel of the implement.

In use, the seeder or other implement is moved forwardly in the manner necessary for performance of its ordinary work. At the same time the prong frame is oscillated pendulum fashion in a fore and aft direction (parallel to the line of draft) as indicated by dotted lines in Figure 1. When the prong frame moves rearwardly, relative to the implement, the prongs abut their stops and extend rigidly downward into the mulch. When the prong frame moves forwardly the prongs are free to pivot so that they incline away from the direction of motion and trail or ride freely and ineffectively over the mulch. The speed of prong frame oscillation is preferably so selected that the mean speed of rearward motion is greater than or at least equal to the speed of implement forward travel.

This provision ensures that while the working prongs have rearward motion relative to the implement, they have substantially zero motion or negatively directed motion (i. e., opposite to the direction of implement travel) relative to the mulch. The mulch is thus subjected to a clawing action which relative to the implement thrusts the mulch rearwardly or at worst pins it stationarily to the ground, thereby preventing, or largely or practically preventing the mulch from moving in the direction of implement travel.

It will be appreciated that the prongs may be mounted in any one of several different ways, provided they have the ability to project stiffly into the mulch when moving in one direction and to ride freely over the mulch when moving in the opposite direction. The prongs may thus be spring fingers or the like adapted to strut stiffly when pressure is applied from one side and to collapse resiliently when pressure is applied to the opposite side.

In the alternative embodiment illustrated by Figures 5 and 6, the prong frame is the same as that shown in Figures 1 and 2 inasmuch as it consists of lateral members 25 and longitudinal members 26, and carries prongs 27 in brackets 28, the integers numbered 25 to 28 being the same as those respectively marked 11, 12, 15 and 17 in Figures 1 and 2. In this embodiment the hanger form of frame suspension has been replaced by rigid strutted (29) posts 30 carrying freely revoluble rollers 31 able to roll in channel runways 32. The runways are fixed to the implement chassis in any convenient manner (for example, the channels may be bolted by their upper flanges to the undersides of the implement chassis laterals, one of which is indicated by 33 in Figure 2). This arrangement enables the prong assembly to move within a plane, thus avoiding any likelihood of losing effective mulch penetration or prong pinning, which might otherwise occur at the end points of prong motion when moving arcuately. Oscillation of the frame 25—26 may be effected by coupling one or more connecting rods such as 19 (Figure 1) to one or more of the posts 30, the connecting rods being furnished with drive means as already described herein. The posts 30 may be medially jointed so that they may fold with a knee action to enable rising of the prong frame.

It will be clear that the prongs may be presented to the mulch in many ways which are structurally distinct but mechanically equivalent insofar as the said prongs and their mountings and movement achieve the required result, namely, the result of preventing forward motion of a mulch, by reciprocating or otherwise oscillating prongs so that when moving in one direction they perform a working stroke by pinning a mulch or thrusting it rearwardly and when moving in opposite direction, they perform a non-working stroke by ineffective disengagement from the mulch.

It is believed in view of the foregoing that a further detailed description of the invention is unnecessary. Likewise, it is believed that the advantages of the invention will be readily apparent.

Having thus fully described the invention, what is claimed as new and desired to be secured by Letters Patent is:

1. For use with an implement having earthworking elements, devices for restraining motion of a mulch in the travel direction of said implement, comprising a supporting structure adapted for rigid affixture on said implement, hanger members supported by their upper ends on said supporting structure and movable to and fro in said travel direction, a prong frame secured to the lower ends of said hanger members, a multiplicity of mulch engaging prongs pivotally suspended on said prong frame for swing motion in said travel direction, and stops on said frame to limit the pivotal movement of said prongs.

2. Mulch handling devices according to claim 1 wherein said hanger members are pendulum hangers hingedly connected by their upper ends to said supporting structure and hingedly connected by their lower ends to said prong frame.

3. Mulch handling devices according to claim 1 wherein said supporting structure comprises a pair of runways disposed horizontally and parallel to said travel direction, and wherein each of said hanger members consists of a post having its lower end fixed to said prong frame, and a roller which is journalled on the upper end of said post and is movable longitudinally of one of said runways.

JOHN ALOYSIUS STEVENS.

REFERENCES CITED

The following references are of record in the file of this patent:

UNITED STATES PATENTS

| Number | Name | Date |
| --- | --- | --- |
| 651,332 | Anderson | June 12, 1900 |
| 715,812 | Johnston | Dec. 16, 1902 |
| 853,267 | Schmitt | May 14, 1907 |
| 877,988 | Edwards | Feb. 4, 1908 |
| 1,241,596 | Woodard | Oct. 2, 1917 |
| 1,252,128 | McCallum | Jan. 1, 1918 |
| 1,303,769 | Campbell | May 13, 1919 |
| 1,754,103 | Hjermstad | Apr. 8, 1930 |
| 1,844,455 | Anderson et al. | Feb. 9, 1932 |
| 1,868,330 | Martin | July 19, 1932 |
| 2,330,586 | Hurlimann | Sept. 28, 1943 |

FOREIGN PATENTS

| Number | Country | Date |
| --- | --- | --- |
| 477,804 | France | Nov. 10, 1915 |